United States Patent
Arth et al.

(10) Patent No.: US 9,031,283 B2
(45) Date of Patent: May 12, 2015

(54) SENSOR-AIDED WIDE-AREA LOCALIZATION ON MOBILE DEVICES

(71) Applicant: QUALCOMM Incorporated, San Diego, CA (US)

(72) Inventors: Clemens Arth, Judendorf-Straßengel (AT); Alessandro Mulloni, Vienna (AT); Gerhard Reitmayr, Graz (AT); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 13/719,012

(22) Filed: Dec. 18, 2012

(65) Prior Publication Data
US 2014/0016821 A1   Jan. 16, 2014

Related U.S. Application Data

(60) Provisional application No. 61/670,990, filed on Jul. 12, 2012.

(51) Int. Cl.
G06K 9/00 (2006.01)
G06T 7/00 (2006.01)
H04N 5/232 (2006.01)

(52) U.S. Cl.
CPC .......... *G06K 9/00671* (2013.01); *G06T 7/0018* (2013.01); *G06T 7/0046* (2013.01); *G06T 2207/10016* (2013.01); *G06T 2207/30244* (2013.01); *H04N 5/23238* (2013.01)

(58) Field of Classification Search
None
See application file for complete search history.

(56) References Cited

U.S. PATENT DOCUMENTS

| | | |
|---|---|---|
| 6,895,126 B2 | 5/2005 | Di Bernardo et al. |
| 2006/0007308 A1 | 1/2006 | Ide et al. |
| 2008/0170118 A1 | 7/2008 | Albertson et al. |
| 2010/0004995 A1 | 1/2010 | Hickman |
| 2012/0033032 A1 | 2/2012 | Kankainen |

OTHER PUBLICATIONS

Arth, et al., "Real-time self-localization from panoramic images on mobile devices", IEEE International Symposium on Mixed and Augmented Reality, Science and Technolgy Proceedings, 2011, pp. 37-46.

(Continued)

*Primary Examiner* — Stephen R Koziol
*Assistant Examiner* — Amandeep Saini
(74) *Attorney, Agent, or Firm* — Silicon Valley Patent Group LLP

(57) ABSTRACT

A mobile device uses vision and orientation sensor data jointly for six degree of freedom localization, e.g., in wide-area environments. An image or video stream is captured while receiving geographic orientation data and may be used to generate a panoramic cylindrical map of an environment. A bin of model features stored in a database is accessed based on the geographic orientation data. The model features are from a pre-generated reconstruction of the environment produced from extracted features from a plurality of images of the environment. The reconstruction is registered to a global orientation and the model features are stored in bins based on similar geographic orientations. Features from the panoramic cylindrical map are matched to model features in the bin to produce a set of corresponding features, which are used to determine a position and an orientation of the camera.

36 Claims, 10 Drawing Sheets

(56) References Cited

OTHER PUBLICATIONS

Arth, et al., "Wide Area Localization on Mobile Phones", IEEE International Symposium on Mixed and Augmented Reality, Science and Technology Proceedings, 2009, pp. 73-82.

Irschara et al., "From Structure-from-Motion Point Clouds to Fast Location Recognition," CVPR, 2009, pp. 2599-2606.

Kurz, et al. "Inertial sensor-aligned visual feature descriptors," In Proc. IEEE Conference on Computer Vision and Pattern Recognition (CVPR2011), pp. 161-166, Colorado Springs, USA, 2011.

Takacs G et al: "Outdoors augmented reality on mobile phone using loxel-based visual feature organization", Proceedings of the Workshop on Multimedia Information Retrieval(M1RO), XX,Vancouver, B. C.,Canada, Oct. 27, 2008, pp. 427-434, XP007915264, DOI:10. 1145/1460096.1460165.

Gardiner K., et al., "Viewer-based Directional Querying for Mobile Applications", Web Information Systems Engineering Workshops, 2003, Proceedings. Fourth International Conference on Rome, Italy Dec. 13, 2003, Piscataway, NJ, USA, IEEE, Jan. 1, 2003, pp. 83-91, XP010697492.

International Search Report and Written Opinion—PCT/US2013/045468—ISA/EPO—Sep. 16, 2013.

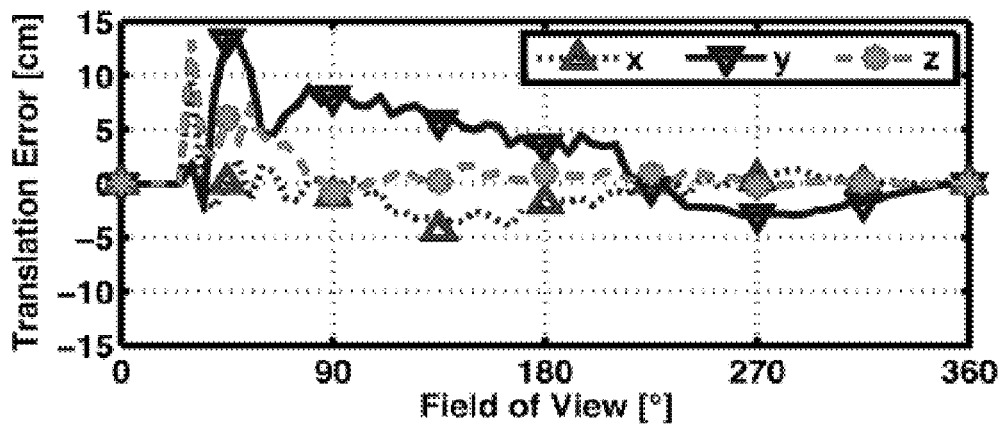
Fig. 9
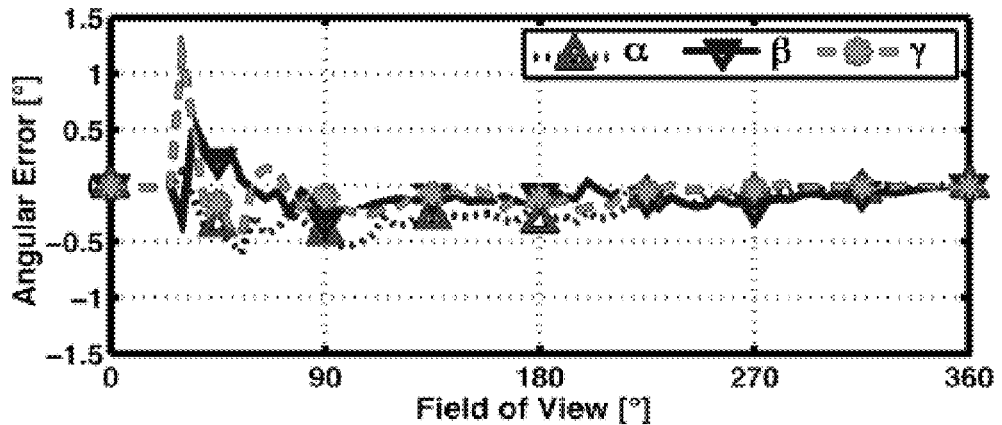
Fig. 10
|  | Panorama generation | Feature extraction | Feature matching | Pose estim. |
|---|---|---|---|---|
| W/o sensors | 9.1 | 4.9 | 36.8 | 0.7 |
| With sensors | | 4.9 | 8.2 | 0.2 |
Fig. 11
|  | Avg. T2L [s] | Min./Max. T2L [s] | Avg./Max. Speedup |
|---|---|---|---|
| W/o sensors | 14.18 | 3.17/22.30 | 1.71/3.88 |
| With sensors | 8.30 | 2.80/14.41 | |
Fig. 12

SENSOR-AIDED WIDE-AREA LOCALIZATION ON MOBILE DEVICES

CROSS-REFERENCE TO PENDING PROVISIONAL APPLICATION

This application claims priority under 35 USC 119 to U.S. Provisional Application No. 61/670,990, filed Jul. 12, 2012, and entitled "Sensor-Aided Wide-Area Localization On Mobile Devices" which is assigned to the assignee hereof and which is incorporated herein by reference.

BACKGROUND

1. Background Field

Embodiments of the subject matter described herein are related generally to position and tracking, and more particularly to vision based tracking of mobile devices.

2. Relevant Background

Highly accurate 6-degree-of-freedom (DOF) self-localization with respect to the user's environment is an inevitable necessity for correct and visually pleasing results in Augmented Reality (AR). An efficient way to perform self-localization is to use sparse 3D point cloud reconstructions of the environment and to perform feature matching between the camera live image and the reconstruction. From the feature matches, the position and orientation, i.e., the pose, can be estimated. A challenge that is faced in mobile AR, e.g., AR performed on mobile devices such as cellular telephones or smart phones, is that the pose estimate is often generated in wide-area environments, for example, outdoors. Due to the interactive nature of AR applications, localization time has a direct impact on the user experience of an AR application, because it determines how long the user must wait before interaction with the application may start. Thus, it is desirable to localize a mobile device quickly, e.g., within a few seconds, with the limited processing power found in mobile devices, while maintaining the necessary accuracy in the pose (position and orientation) for the desired application, e.g., sub-meter accuracy for position and less than 5° angular error for orientation.

In the Computer Vision (CV) field, the localization problem has been solved mainly on a coarse scale using computationally demanding algorithms. Moreover, the localization task typically is solved with accuracies of up to several meters. Additionally, typical localization solutions determine a position only with two-degrees of freedom (2DOF) or three degrees of freedom (3DOF), rather than a full six-degrees of freedom (6DOF) pose. Therefore, conventional localization approaches are not directly suitable for mobile AR applications or other similarly demanding applications.

SUMMARY

A mobile device uses vision, orientation, and optionally, position sensor data jointly for six degree of freedom localization, e.g., in wide-area environments. An image or video stream is captured while receiving geographic orientation data and may be used to generate a panoramic cylindrical map of an environment. A bin of model features stored in a database is accessed based on the geographic orientation data. For example, a data set block including a plurality of bins of model features may be obtained from the database based on a rough position of the mobile device, and the appropriate bin accessed based on geographic orientation data. The model features are from a pre-generated reconstruction of the environment produced from extracted features from a plurality of images of the environment. The reconstruction is registered to a global orientation and the model features are stored in bins based on similar geographic orientations. Features from the panoramic cylindrical map are matched to model features in the bin to produce a set of corresponding features, which are used to determine a position and an orientation of the camera.

In one implementation, a method includes capturing an image of an environment; receiving geographic orientation data associated with the image; accessing a bin of model features from a database based on the geographic orientation data, wherein the model features are from a pre-generated three-dimensional model of the environment and are binned in the database based on geographic orientation of the model features; extracting features from the image; comparing the features extracted from the image to model features in the bin of model features to produce a set of corresponding features; and using the set of corresponding features to determine a position and an orientation of the camera.

In one implementation, an apparatus includes a camera capable of capturing images of an environment; an orientation sensor capable of providing geographic orientation data; and a processor coupled to the camera and the orientation sensor, the processor configured to extract features from an image, determine a geographic orientation for each feature; access a bin of model features for a database based on the geographic orientation of each feature, wherein the model features are from a pre-generated three-dimensional model of the environment and are binned in the database based on geographic orientation of the model features; compare the features extracted from the image to the bin of model features to produce a set of corresponding features; and use the set of corresponding features to determine a position and an orientation of the camera.

In one implementation, an apparatus includes means for capturing an image of an environment; means for receiving geographic orientation data associated with the image; means for accessing a bin of model features from a database based on the geographic orientation data, wherein the model features are from a pre-generated three-dimensional model of the environment and are binned in the database based on geographic orientation of the model features; means for extracting features from the image; means for comparing the features extracted from the image to model features in the bin of model features to produce a set of corresponding features; and means for using the set of corresponding features to determine a position and an orientation of the camera.

In one implementation, a non-transitory computer-readable medium including program code stored thereon, includes program code to receive geographic orientation data associated with an image of an environment; program code to access a bin of model features from a database based on the geographic orientation data, wherein the model features are from a pre-generated three-dimensional model of the environment and are binned in the database based on geographic orientation of the model features; program code to extract features from the image; program code to compare the features extracted from the image to model features in the bin of model features to produce a set of corresponding features; and program code to use the set of corresponding features to determine a position and an orientation of the camera In one implementation, a method includes obtaining a plurality of images of an environment; extracting features from the plurality of images; generating a reconstruction of the environment using the features; registering the reconstruction of the environment to a global orientation; associating a geographic orientation with each feature; and storing the reconstruction of the environment with the features binned together into a plurality of bins, wherein each bin is associated with a different predetermined range of geographic orientation.

In one implementation, an apparatus includes a database; a processor coupled to the database, the processor being configured to generate a reconstruction of an environment using features extracted from a plurality of images of the environment, register the reconstruction of the environment to a global orientation, associate a geographic orientation with each feature; and store in the database the reconstruction of the environment with the features binned together into a plurality of bins, wherein each bin is associated with a different predetermined range of geographic orientation.

In one implementation, an apparatus includes means for obtaining a plurality of images of an environment; means for extracting features from the plurality of images; means for generating a reconstruction of the environment using the features; means for registering the reconstruction of the environment to global orientation; means for associating a geographic orientation with each feature; and means for storing the reconstruction of the environment with the features binned together into a plurality of bins, wherein each bin is associated with a different predetermined range of geographic orientation.

In one implementation, a non-transitory computer-readable medium including program code stored thereon, includes program code to extracting features from a plurality of images of an environment; program code to generate a reconstruction of the environment using the features; program code to register the reconstruction of the environment to global orientation; program code to associate a geographic orientation with each feature; and program code to store the reconstruction of the environment with the features binned together into a plurality of bins, wherein each bin is associated with a different predetermined range of geographic orientation.

BRIEF DESCRIPTION OF THE DRAWING

FIG. 9 illustrates a mean translation error for successful localization estimates.

FIG. 10 illustrates a mean rotation error for successful localization estimates.

FIG. 11 shows the average execution time of localization for a system using sensors and a system without sensors.

FIG. 12 shows the time to localize results using for a system using sensors and a system without sensors.

DETAILED DESCRIPTION

Figure 1:
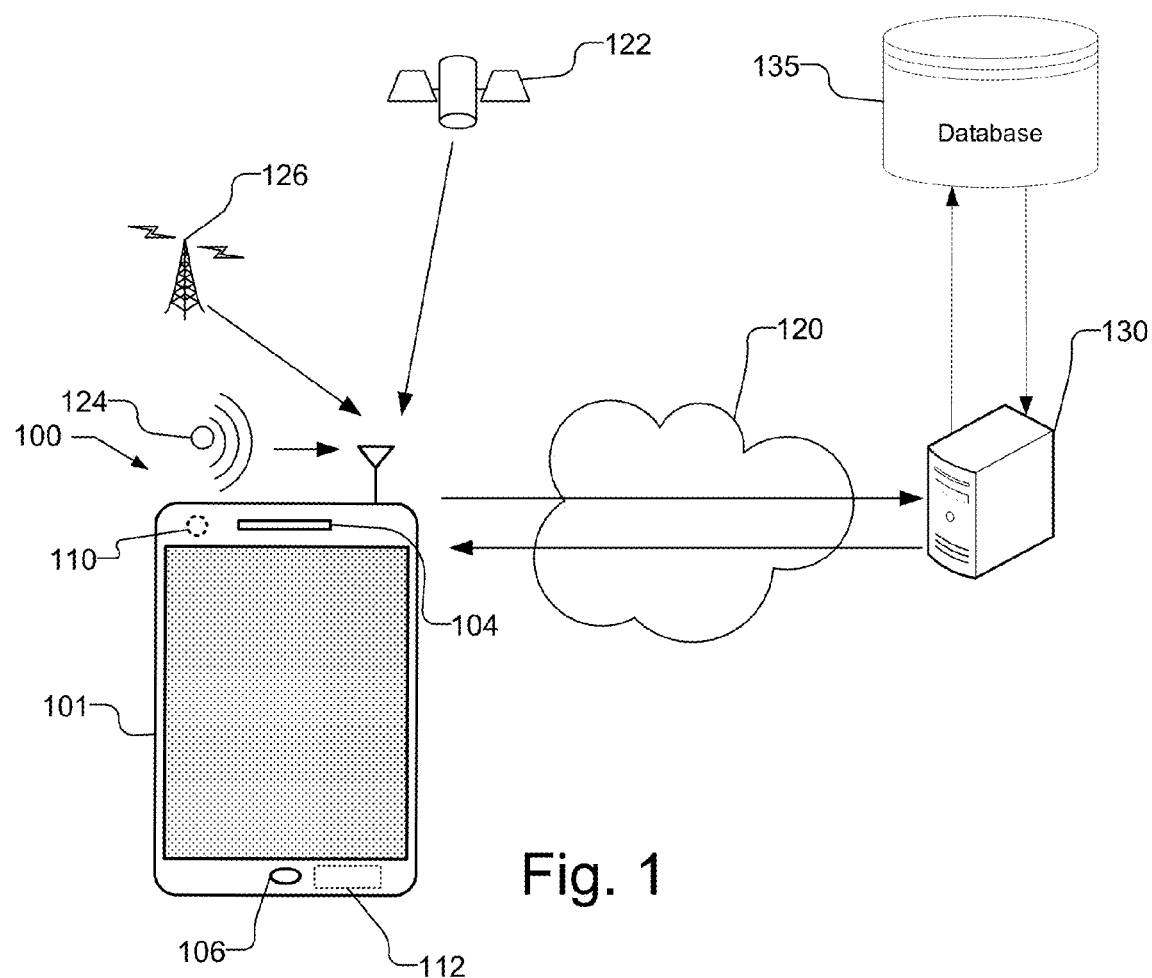
FIG. 1 illustrates a block diagram showing a system including a mobile device and a database capable of enabling joint usage of vision and multiple sensors (GPS, compass, accelerometer) for highly accurate 6DOF localization.

FIG. 1 illustrates a block diagram showing a system including a mobile device 100 and a server 130 with a database 135 capable of enabling joint usage of computer vision and multiple sensors (GPS, compass, accelerometer) for highly accurate 6DOF localization, e.g., in wide-area environments. The database 135 stores three-dimensional (3D) features of the environment that are partitioned based on global orientation, and the mobile device 100 accesses the partitioned features to be used for vision based localization based on sensor information, e.g., compass or magnetometer data.

FIG. 1 illustrates the front side of the mobile device 100 as including a housing 101, a display 102, which may be a touch screen display, as well as a speaker 104 and microphone 106. The mobile device 100 further includes a forward facing camera 110 to image the environment and sensors 112, which may include a magnetometer, gyroscopes, accelerometers, etc. The mobile device 100 is capable of determining its position using conventional positioning techniques, such as a rough GPS measurement using satellite positioning system (SPS) 122, or trilateration using wireless sources such as access points 124 or cellular towers 126. An SPS system 122 of transmitters is positioned to enable entities to determine their location on or above the Earth based, at least in part, on signals received from the transmitters. In a particular example, such transmitters may be located on Earth orbiting satellite vehicles (SVs), e.g., in a constellation of Global Navigation Satellite System (GNSS) such as Global Positioning System (GPS), Galileo, Glonass or Compass or other non-global systems. Thus, as used herein an SPS may include any combination of one or more global and/or regional navigation satellite systems and/or augmentation systems, and SPS signals may include SPS, SPS-like, and/or other signals associated with such one or more SPS.

As used herein, a "mobile device" refers to any portable electronic device such as a cellular or other wireless communication device, personal communication system (PCS) device, personal navigation device (PND), Personal Information Manager (PIM), Personal Digital Assistant (PDA), or other suitable mobile device. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of capturing images (or video) of its environment.

The mobile device 100 accesses the database 135 using the remote server 130 via a wireless network 120 based on an approximate position and global orientation of the mobile device 100. The database 135 may include multiple datasets of 3D features, each associated with a different position.

Additionally, each dataset of 3D features stored in the database 135 is partitioned based on global orientation. Thus, using the position of the mobile device 100, e.g., as determined by the SPS 122, a relevant dataset of 3D features stored in the database 135 may be accessed. Moreover, using the global orientation data received from sensors 112, a partitioned subset of the 3D features that matches the global orientation of the mobile device 100 may be accessed and used for feature matching with the images captured by camera 110. The feature matching may be performed by the mobile device 100 (e.g., where at least a portion of the database 135 is provided to the mobile device 100) or by the remote server 130 (e.g., where the mobile device 100 further transmits image data, such as the image itself or extracted features from the image, to the remote server 130).

Figure 2:
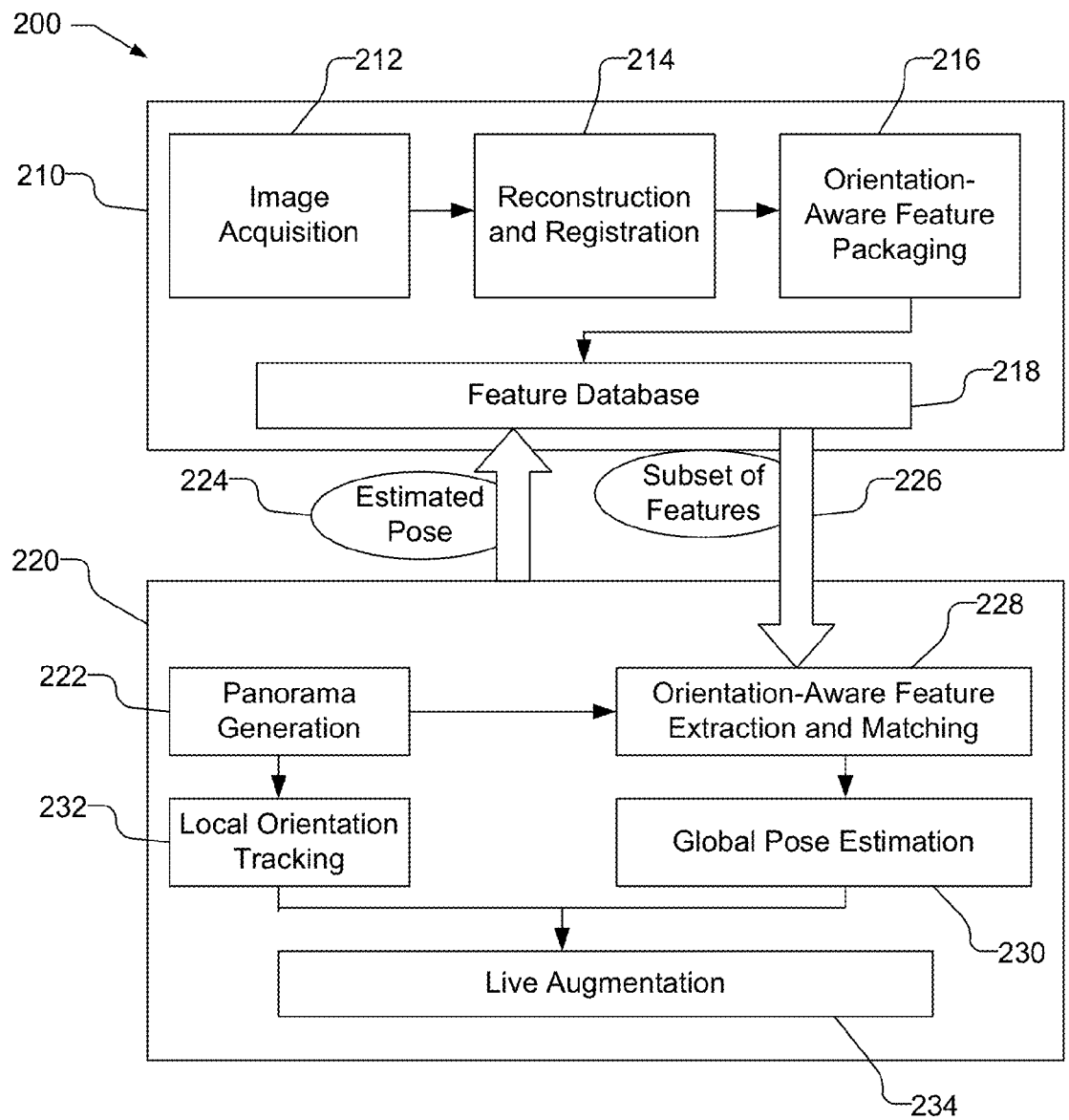
FIG. 2 is a block diagram illustrating the data generation and localization approach that may be used by the system shown in FIG. 1.

FIG. 2 is a block diagram illustrating a localization system 200 that may be used by the system shown in FIG. 1. As shown in FIG. 2, the localization system 200 may be divided into offline data generation 210 and an online localization 220. For the offline data generation 210, image acquisition 212 is performed by obtaining multiple images of an area to be reconstructed. The images may be acquired by taking photographs with a single camera, crowdsourcing images from multiple cameras, or using stored images of the relevant area. Reconstruction and registration (214) is performed on the acquired images. For example, features are extracted from the images using Speeded-up Robust Features (SURF) or other appropriate extraction methods, such as Features from Accelerated Segment Test (FAST) corner detector, or Scale Invariant Feature Transform (SIFT). A sparse point-cloud reconstruction may then be generated using structure-from-motion (SfM) techniques. The resulting reconstruction is registered to global coordinates, including location and orientation, which may be done manually or automatically by aligning the reconstruction from SPS tags attached to the images.

Figure 3:
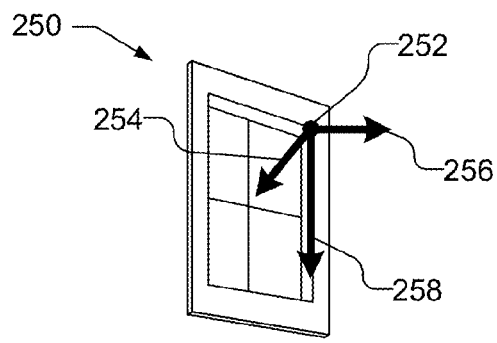
FIG. 3 illustrates orientation-aware feature extraction, including gravity and normal vectors.

During the extraction of features from the images for reconstruction and registration (214), orientation-aware descriptors, e.g., vectors describing the geographic direction and gravity, are included in the feature description. FIG. 3, by way of example, illustrates a perspective view of an imaged window 250 with a 3D point 252 illustrated as including a dominant descriptor 254, as well a normal vector 256, and a gravity vector 258 if desired. The normal vector is the vector perpendicular to the surface to which the 3D point belongs. Such a normal vector may be approximated by calculating the mean of the vectors connecting the 3D point 252 to all cameras that could see the 3D point during image acquisition. Thus, each individual 3D point in the resulting reconstruction is an orientation-aware feature that is not only characterized by a descriptor, but also by a normal vector and, if desired, a gravity vector. Since the reconstruction is upright-oriented, the gravity vector may be used as the common feature orientation, instead of using image gradients. During live localization, the orientation sensors, e.g., accelerometers or gyroscopes, of the mobile device 100 may provide the required gravity vector.

Orientation-aware feature packaging (216) is performed on the resulting reconstruction. For example, the resulting reconstruction may be partitioned into several overlapping blocks, e.g., using a rectangular grid. Each block may cover a specific pre-defined area, such as 50×50 meters. The blocks may overlap if desired, e.g., by 5 to 10 meters. The features in each block may be stored in a separate data set, sometimes referred to herein as a data set block. In addition, the features in each data set block are subdivided in to subsets of data, sometimes referred to herein as bins or data set bins, based on the orientation of the normal vector with respect to the real geographic orientation, i.e., North, South, East West. Since SURF or similarly extracted features can be reasonably redetected under a viewpoint change of, e.g., ±45°, the bins may be generated so that the range of angles overlap, e.g., eight bins may be used, each covering a range of 60°.

Figure 4:
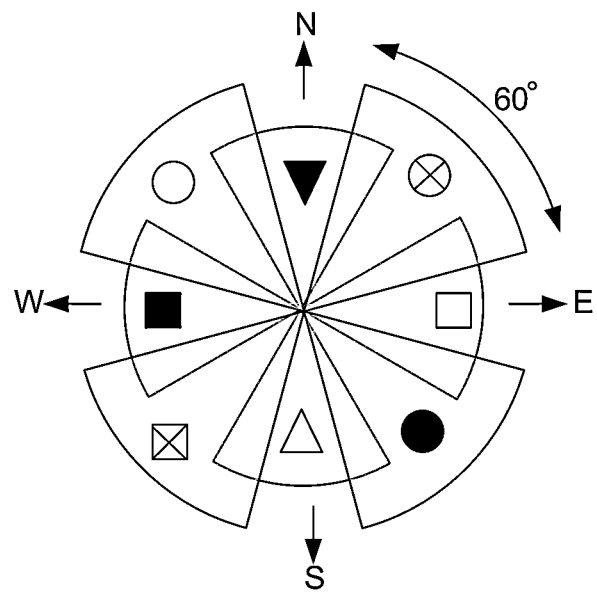
FIGS. 4 and 5 illustrate orientation aware feature binning using geographic orientation.
Figure 5:
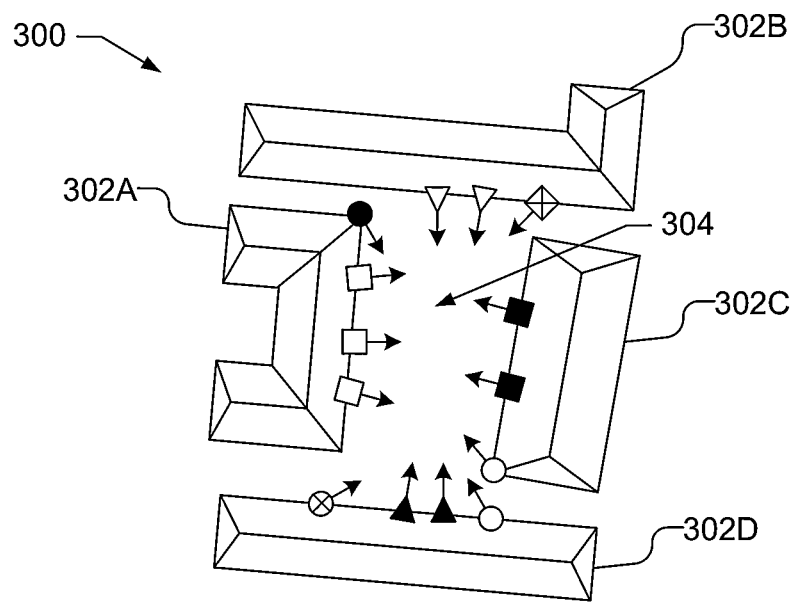

FIG. 4, by way of example, illustrates the range of geographic orientation of eight bins, each covering a range of 60°, where each bin is identified by a different geometric shape, e.g., the bin identified by a white square includes features with a normal vector that is directed East ±30°, the bin identified by a back triangle includes features with a normal vector that is directed North ±30°, etc. For illustration purposes, FIG. 5 shows a top view of an area 300 that includes several buildings 302A, 302B, 302C, and 302D that form an inner courtyard 304. The courtyard 304 may be, e.g., a single block in a reconstruction of the area 300 shown in FIG. 5, but of course, if the courtyard 304 was large, e.g., larger than 50×50 meters, the courtyard 304 may be multiple blocks in the reconstruction. Also illustrated in FIG. 5 are a number of features in the reconstruction of the area 300 that are visible from inside the courtyard 304, where the features are identified by a base with one of the geometric shapes identified in FIG. 4, and an arrow in the direction of the normal vector associated with the feature. As can be seen in FIG. 5, the single block that is formed from the courtyard 304 includes multiple features with different normal vectors. Each of the features in the reconstruction is associated with an appropriate bin based on the geographic orientation of the normal vector of the feature. It should be noted that it may be possible that vectors for features from different locations on the same structure may be placed in different bins. For example, when a façade of a building has a prominent 3D structure, e.g., decoration or signs, features extracted from the prominent 3D structure may be visible when viewing the building from a specific direction, and thus may have a different normal vector and therefore be placed in a different bin than features extracted from other portions of the façade.

With the features in each block of the reconstruction placed into an appropriate geographic orientation identifying bin, an approximate search structure for accelerated matching may be created for each bin as part of the orientation-aware feature packaging (216). Thus, each block in the reconstruction, structured as a data set that includes subsets of data for overlapping geographic orientation identifying bins, is stored in a common feature database 218, such that the data sets can be retrieved on demand.

During localization 220, an image is captured, e.g., in a video stream, which may be used for self-localization, i.e., to determine an estimate of a global pose by comparison to a subset of features in the feature database 218. In one implementation, the captured image may be used to generate a panoramic cylindrical map 222. Generally, for accurate self-localization, a wide baseline for triangulation is desirable and thus use of a panoramic cylindrical map is advantageous, but not necessarily required. Ordinary mobile devices, such as cellular telephones or smart phones, typically include cameras with a narrow field of view (FOV). The narrow FOV of the cameras found in most mobile devices is generally insufficient to provide the wide baseline for triangulation. Accordingly, a panoramic cylindrical map may be generated by tracking a live video stream of images frame-by-frame and mapping the images onto the panoramic cylindrical map by matching extracted features from images. During the frame-by-frame tracking of the vide stream of images to generate the panoramic cylindrical map, features are incrementally extracted from captured images. The features of each newly captured image are compared to previously extracted features of the panoramic cylindrical map to map newly captured image onto the panoramic cylindrical map. The resulting panoramic cylindrical map may be, e.g., 2048×512 pixels. As the panoramic cylindrical map grows, the FOV of the environment increases to provide a wider baseline for localization.

Figure 6:
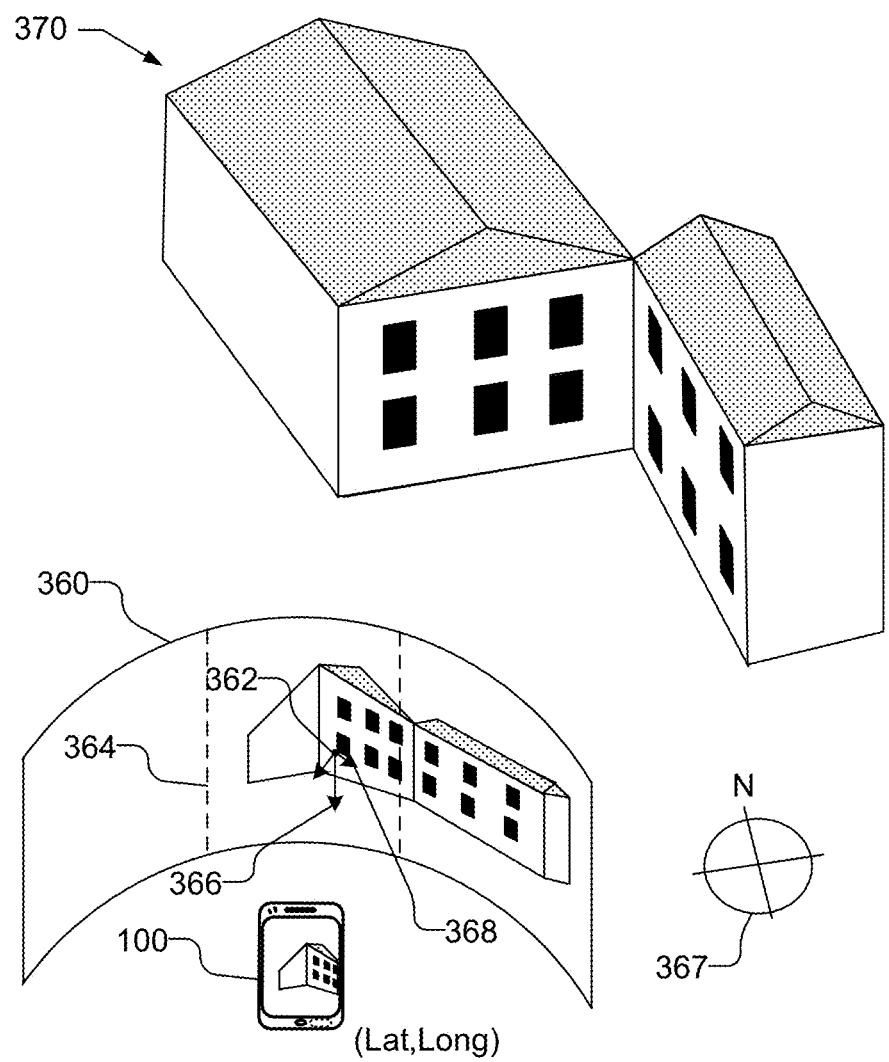
FIG. 6 illustrates a comparison of localization performance for a sensor-aided system and a system without sensors, for two different distance thresholds.

FIG. 6, by way of example, illustrates a mobile device 100 generating a panoramic cylindrical map 360 of buildings 370. The panoramic cylindrical map 360 is generated by rotating the mobile device 100 while capturing images in a video stream, features 362 in the images are extracted and tracked frame by frame to map each image 364 from the video stream onto the panoramic cylindrical map 360. The sensors 112 in the mobile device 100, e.g., an accelerometer and magnetometer, are used to determine the gravity vector 366 and geographic orientation 367 of the normal vector 368 for each feature 362 as the feature is captured. Additionally, the mobile device 100 determines its approximate position (Lat,Long) using, e.g., an SPS position fix, which is sufficiently accurate to identify the, e.g., 50×50 meter block in the reconstruction, where the user is currently located.

As illustrated in FIG. 2, the feature database 218 is accessed based on the estimated pose 224 of the mobile device 100, which includes an approximate position, e.g., as determined by an SPS estimate, and orientation, as determined by, e.g., sensors 112. A data set block corresponding to the approximate position of the mobile device is retrieved from the feature database 218 for matching against the features from the panoramic cylindrical map. Instead of matching an individual feature in the panoramic cylindrical map against all the features from the corresponding data set block, the feature is matched against features from an appropriate subset of data based on geographic orientation, i.e., a bin associated with a range of normal vectors that includes the geographic orientation of the normal vector of the feature from the panoramic cylindrical map. Thus, as illustrated in FIG. 2, a data set block 226 associated with the position of the mobile device, is provided from the feature database 218 for orientation-aware feature extraction and matching 228, where the data set block 226 includes a plurality of subsets, i.e., bins, of features based on the orientation of the normal vector with respect to the real geographic orientation.

Established correspondences from the orientation-aware feature extraction and matching 228 are used for a global pose estimation 230. The global pose estimation may be a robust 3-Point-Pose (3PP) algorithm that determines a full 6DOF global pose for the mobile device. By generating a global pose estimate for the mobile device 100, the panoramic cylindrical map is registered to the world reference frame. The process of aligning the panoramic cylindrical map with the world reference frame needs to be accomplished only once for a panoramic cylindrical map.

Additionally, local orientation tracking 232 may be performed based on the panoramic cylindrical map generated in 222. Local orientation tracking compares a current image captured by the mobile device to the panoramic cylindrical map, e.g., using feature extraction and matching techniques, to determine a local orientation estimate of the mobile device. The local orientation estimate from 232 may be combined with the global pose estimate 230 to produce a combined pose that may be used for, e.g., live augmentation 234, or other appropriate applications.

FIGS. 7-12 illustrate results of quantitative tests performed on the global pose estimate generated in 230 of FIG. 2 during the localization process. Localization was considered successful if the translational distance from the ground truth position is below a specified threshold. Translational distance was only considered as the probability of having a correct position estimate but a wrong orientation estimate with the disclosed localization process is very low.

Figure 7:
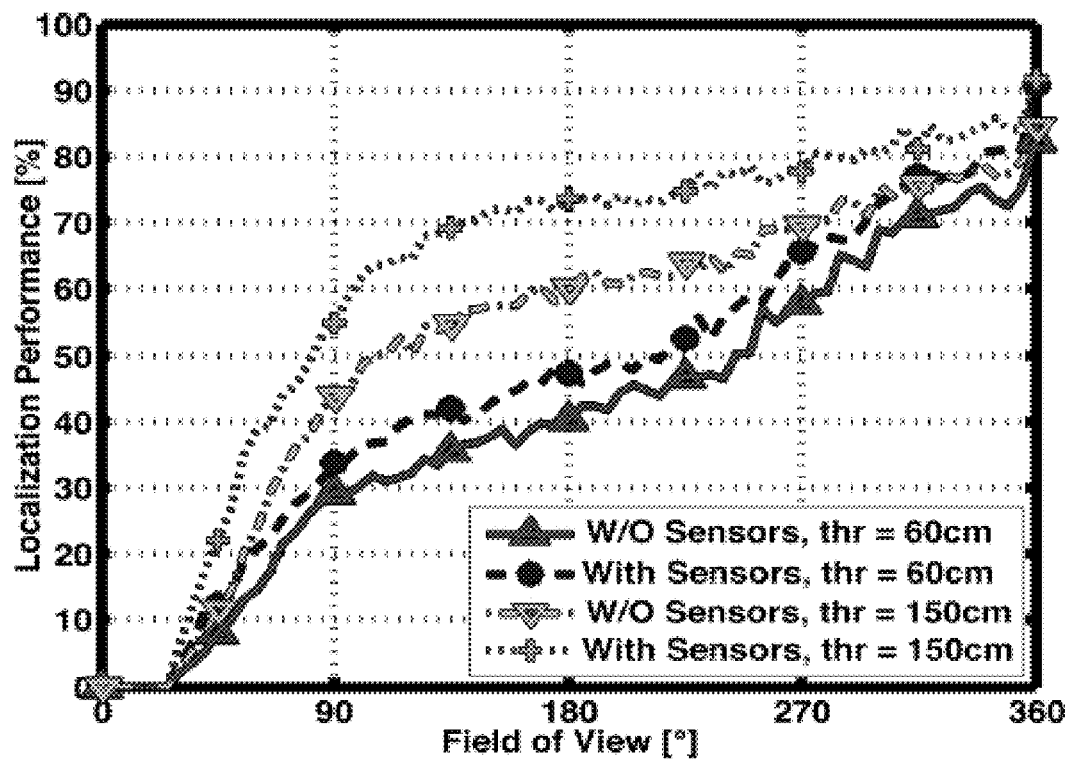
FIG. 7 illustrates a comparison of localization performance for a sensor-aided system and a system that does not use sensors using two different distance thresholds.

Panoramic cylindrical maps were simulated with varying FOVs by cropping the panoramic cylindrical maps from 30° to 360° in steps of 5°, initially pointing towards a building façade. FIG. 7 illustrates a comparison of localization performance for a sensor-aided system, such as that described herein, and a system that does not use sensors, for two different distance thresholds 60 cm and 150 cm. As can be seen in FIG. 7, a greater improvement is gained for a looser distance threshold, i.e., 150 cm, which is due to the wide baseline demands of the 3PP algorithm that are violated by a small FOV. Moreover, as can be seen, systems with sensors improve upon previous localization techniques that do not use sensors by up to 15%. It should be noted that there is a proportional relationship between the FOV and the time to localize (T2L). The T2L is a measure for speed, i.e., the time between application start-up and producing a localization estimate, which is practically the time a user must spend capturing a panoramic cylindrical map, before localization succeeds. The T2L is proportional to the FOV of the panoramic cylindrical map, which is generated by rotating the camera while capturing images. Thus, an improvement in localization performance with a smaller FOV results in a decrease in the T2L, i.e., pushing the performance curve in FIG. 7 towards the upper left corner means a significant decrease in the T2L.

Figure 8:
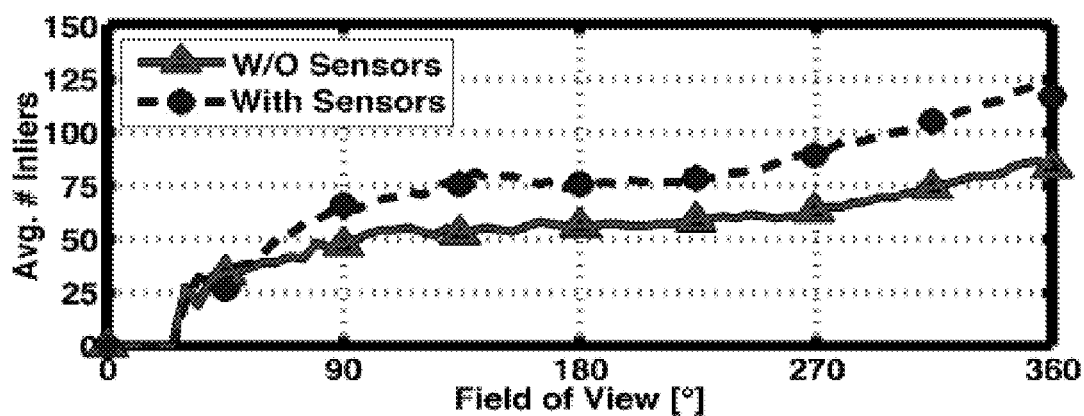
FIG. 8 shows a comparison of inliers for a sensor-aided and a system without sensors.

FIG. 8 shows a comparison of average number of inliers for a sensor-aided system, such as that described herein, and a system that does not use sensors. Due to the sensor-aided feature management, the number of inliers can be increased by up to 50%. This in turn increases robustness considerably, since the average percentage of inliers is only between 5-10% of the total number of feature correspondences.

FIG. 9 illustrates translation error and FIG. 10 illustrates an angular error, for a distance threshold of 30 cm, with respect to the FOV of the panoramic cylindrical map, for a sensor-aided system, such as that described herein. As can be seen in FIG. 9, if localization succeeds, the error in translation is below 15 cm for all three dimensions, where x is the left and right of the camera, y is in the vertical direction and z is in the forward direction. Moreover, as can be seen, the error in translation decreases with as the FOV of the panoramic cylindrical map increases. Similarly, as can be seen in FIG. 10, the angular error is below 1.5° for all axes of rotation and further decreases as the FOV of the panoramic cylindrical map increases.

FIGS. 11 and 12 illustrates the results of qualitative validation for global pose estimate generated in 230 of FIG. 2 during the localization process using an iPhone 4S. The qualitative validation was performed by recording 21 different video streams, with accompanying sensor measurements, in an area of one block. The video streams were initiated in random view directions and a constant rotational velocity around the vertical axis was used while generating the panoramic cylindrical map. The video streams were processed on the same device, both with and without using sensor information.

FIG. 11 shows the average execution time for individual processes (in milliseconds) for a method with sensors and a method without sensors. As can be seen, sensors mainly have an impact on feature matching time, which is due to the fact that when sensors are used, features are only matched against the feature bin corresponding to their normal vector, as opposed to matching against all features in the dataset. The speed of pose estimation is also improved if sensors are used. This is due to the higher percentage of inliers found.

FIG. 12 shows the T2L results for a method with sensors and a method without sensors. As can be seen, the sensor-aided method has an improvement of the average T2L of 1.71s over a method without sensors, which is nearly four times faster. Thus, on average, users may expect that AR applications using the present sensor-aided method will initialize in half of the time compared to applications based on the conventional localization methods without sensors.

Figure 13:
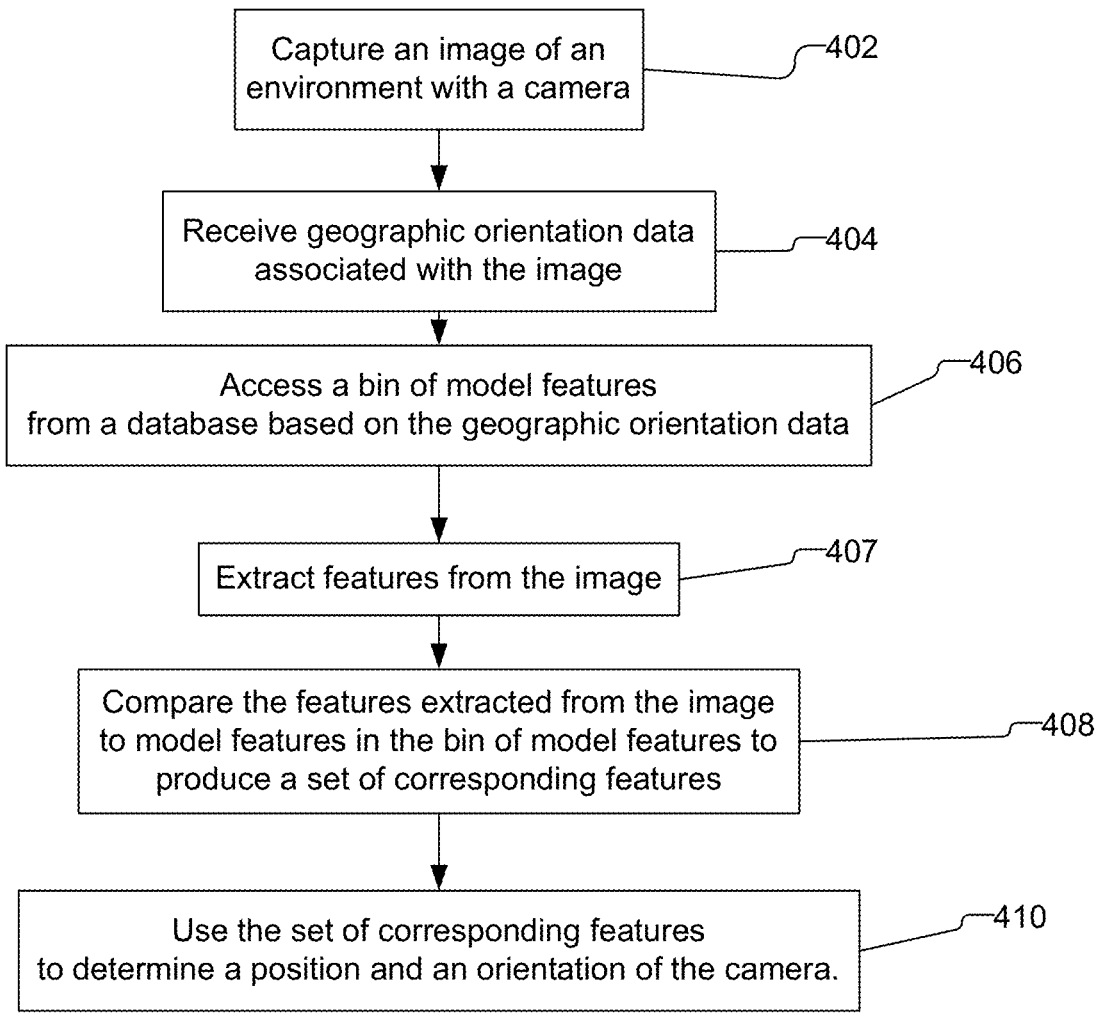
FIG. 13 is a flow chart illustrating a method of localization using geographic orientation data.

FIG. 13 is a flow chart illustrating a method of localization using geographic orientation data. As illustrated, a mobile device captures an image of an environment (402), which may be, e.g., a frame from a series of video frames. In one implementation, discussed above, the image may be used to produce at least a portion of a panoramic cylindrical map of an environment (402). The at least the portion of the panoramic cylindrical map may be produced by extracting features from captured images of the environment and mapping the captured images onto the panoramic cylindrical map. Geographic orientation data associated with the image is received (404), e.g., from an orientation sensor. For example, the geographic orientation data may be received during or shortly before or after capturing the image so that the geographic orientation data is approximately contemporaneous with capturing the image. A bin of model features is accessed from a database based on the geographic orientation data, wherein the model features are from a pre-generated three-dimensional model of the environment and are binned in the database based on geographic orientation of the model features (406). Features are extracted from the image (407). Features extracted from the image are compared to model features in the bin of model features to produce a set of corresponding features (408). By way of example, the extracted features may be used to produce the portion of the panoramic cylindrical map of the environment, the extracted features are stored in the panoramic cylindrical map of the environment and the stored features are compared to the model features. The set of corresponding features are used to determine a position and an orientation of the camera (410). If desired, in addition to receiving geographic orientation data in step 404, position data may also be received, e.g., from an SPS receiver. When position data is received, accessing the bin of model features from the database in step 406 includes accessing a data set block of model features from the database based on the position data, wherein the data set block of model features comprises a plurality of bins of model features, and using the geographic orientation data to access the bin of model features from the plurality of bins of model features in the data set block. The method may include determining a normal vector for each feature and associating the geographic orientation data to the normal vector for each feature. Thus, accessing the bin of model features from the database in step 406 may include using the geographic orientation data associated with the normal vector for each feature to retrieve model features from a corresponding bin of model features with normal vectors in a range of geographic orientations that includes the geographic orientation data associated with the normal vector. Additionally, a gravity vector may be determined, e.g., from an accelerometer, for each feature. The gravity vector may be used when comparing the features extracted from the image to the model features in the bin of model features to produce the set of corresponding features, wherein each model feature has an associated gravity vector.

Figure 14:
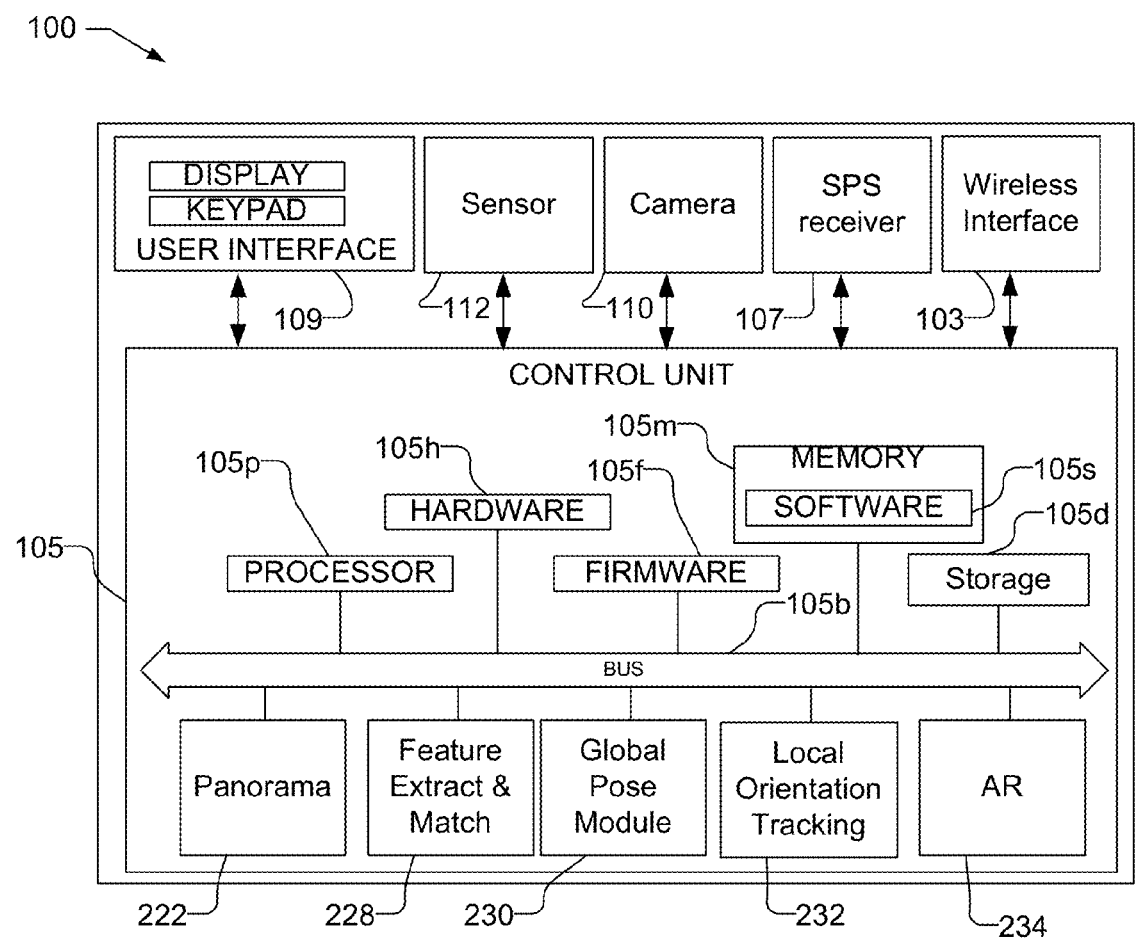
FIG. 14 is a block diagram of a mobile device capable of localization using geographic orientation data.

FIG. 14 is a block diagram of a mobile device 100 capable of localization using geographic orientation data. The mobile device 100 may include a wireless interface 103 to access a database 135 through the remote server 130 via the wireless network 120 as illustrated in FIG. 1. The mobile device 100 further includes a camera 110, and sensors 112, which may include a magnetometer, compass, gyroscope, accelerometers etc. The mobile device 100 may further include an SPS receiver 107 for receiving position data. The mobile device 100 may further include a user interface 109 that may include e.g., a display, as well as a keypad or other input device through which the user can input information into the mobile device 100.

The wireless interface 103 may be used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The mobile device 100 also includes a control unit 105 that is connected to and communicates with the camera 110, sensors 112, SPS receiver 107 and wireless interface 103. The control unit 105 accepts and processes the orientation data and image data provided by the sensors 112 and camera 110, as well as data provided by the SPS receiver 107 and wireless interface 103. The control unit 105 may be provided by a bus 105*b*, processor 105*p* and associated memory 105*m*, hardware 105*h*, firmware 105*f*, and software 105*s*. The control unit 105 may further include storage 105*d*, which may be used to store the database or a portion of the database locally on the mobile device 100. The control unit 105 is further illustrated as including a panorama generation module 222 that generates a panoramic cylindrical map using images captured by the camera 110. The control unit 105 further includes a feature extraction and matching module 228 that extracts and matches features from the panoramic cylindrical map with features obtained from a database based on geographic orientation. A global pose module 230 determines the pose of the mobile device based on corresponding features and a local orientation tracking module 232 tracks the pose of the mobile device with respect to the panoramic cylindrical map. An AR unit 234 may be used to render the graphical data based on the global pose and tracking The various modules 222, 228, 230, 232, and 234 are illustrated separately from processor 105*p* for clarity, but may be part of the processor 105*p* or implemented in the processor based on instructions in the software 105*s* which is run in the processor 105*p*, or may be implemented in hardware 105*h* or firmware 105*f*. It will be understood as used herein that the processor 105*p* can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105*h*, firmware 113*f*, software 105*s*, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105*m* and executed by the processor 105*p*. Memory 105*m* may be implemented within or external to the processor 105*p*. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the mobile device 100 may include a means for capturing an image of an environment, which may be, e.g., the camera 110. A means for receiving geographic orientation data associated with the image may be, e.g., sensors 112 such as a magnetometer, gyroscope, compass, etc. A means for accessing a bin of model features from a database based on the geographic orientation data, wherein the model features are from a pre-generated three-dimensional model of the environment and are binned in the database based on geographic orientation of the model features may be, e.g., the wireless interface 103 used to communicate with remote server 130 and database 135 shown in FIG. 1, or the storage database 105*d* if the database or a portion of the database is stored locally on the mobile device 100. A means for extracting features from the image may be e.g., the feature extraction and matching module 228. A means for comparing the features extracted from the image to model features in the bin of model features to produce a set of corresponding features may be, e.g., the feature extraction and matching module 228. A means for using the set of corresponding features to determine a position and an orientation of the apparatus may be, e.g., the global pose module 230. The mobile device may further include means for producing at least a portion of a panoramic cylindrical map of the environment using the features extracted from the image, which may be, e.g., the panorama generation module 222. The mobile device may further include means for receiving position data, which may be, e.g., the SPS receiver 107. A means for determining a normal vector for each feature may be, e.g., the panorama generation module 222 and/or the feature extraction and matching module 228. A means for determining a gravity vector for each feature may be, e.g., sensors 112, such as accelerometers. A means for using the gravity vector to associate the geographic orientation data to the normal vector for each feature may be, e.g., the panorama generation module 222 and/or the feature extraction and matching module 228.

Figure 15:
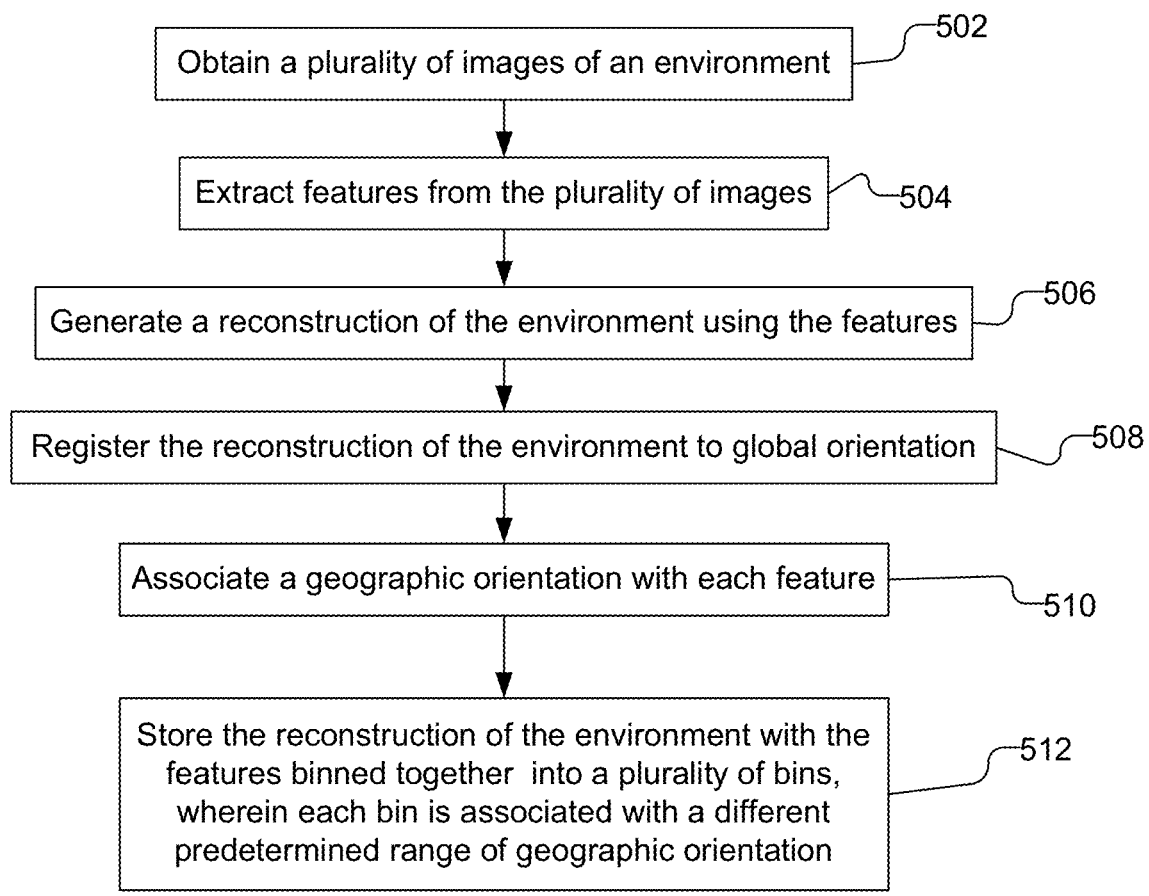
FIG. 15 is a flow chart illustrating a method of data generation for a reconstruction model of an environment based on geographic orientation.

FIG. 15 is a flow chart illustrating a method of data generation for a reconstruction model of an environment based on geographic orientation. As illustrated, a plurality of images of an environment is obtained (502). Features are extracted from the plurality of images (504) and a reconstruction of the environment is generated using the features (506). The reconstruction of the environment is registered to global orientation (508). A geographic orientation is associated with each feature (510). For example, a normal vector may be determined for each feature and an orientation of the normal vector for each feature may be associated with respect to the geographic orientation. The normal vector for a feature may be determined by determining the vectors joining the three-dimensional position of the feature and the positions of all cameras that capture images of the three-dimensional position in the plurality of images of the environment; and calculating a mean of the vectors as the normal vector. The reconstruction of the environment is stored with the features binned together into a plurality of bins, wherein each bin is associated with a different predetermined range of geographic orientation (512), i.e., each bin includes features having an associated geographic orientation that falls within a predetermined range that differs for each bin. In addition, geographic orientation information may be received from a mobile device, and in response stored features for the reconstruction of the environment are retrieved based on the geographic orientation information.

Figure 16:
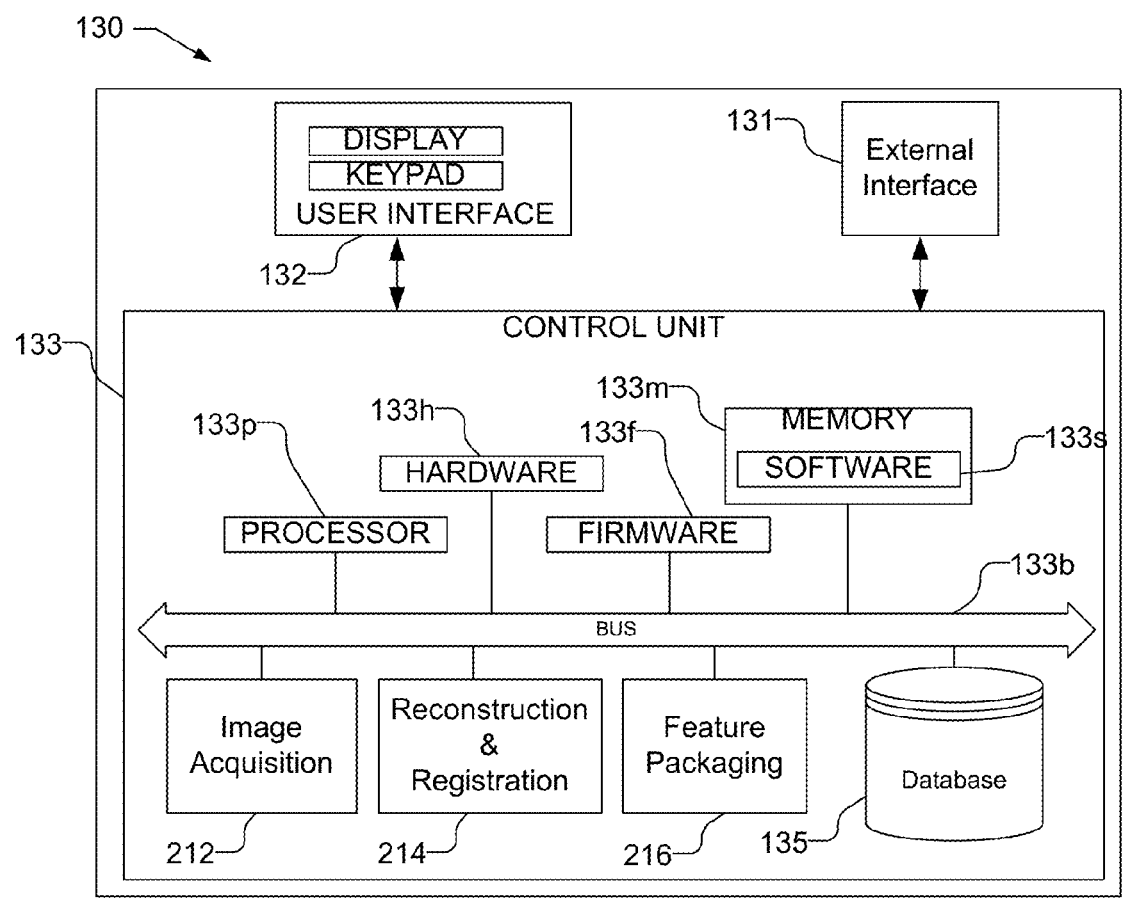
FIG. 16 is a block diagram of a server capable of data generation for a reconstruction model of an environment based on geographic orientation.

FIG. 16 is a block diagram of a server 130 capable of data generation for a reconstruction model of an environment based on geographic orientation. The server 130 includes an external interface 131 that is used to communicate with and receive image data of an environment and may be used to communicate with mobile devices. The server 130 may further include a user interface 132 that may include e.g., a display, as well as a keypad or other input device through which the user can input information into the server 130.

The external interface 131 may be a wired interface to a router (not shown) or a wireless interface used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATS) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The server 130 also includes a control unit 133 that is connected to and communicates with the external interface 131. The control unit 133 accepts and processes the image data of the environment. The control unit 133 may be provided by a bus 133$b$, processor 133$p$ and associated memory 133$m$, hardware 133$h$, firmware 133$f$, and software 133$s$. The control unit 133 is further illustrated as including an image acquisition module 212 that acquires images of an environment, e.g., via external interface 131. A reconstruction and registration module 214 extracts features from the images and reconstructs the environment registered to a global orientation. A feature packaging module 216 associates a geographic orientation with each feature. The reconstruction of the environment is stored in the database 135 with the features binned based on similar geographic orientations.

The different modules 212, 214, and 216 are illustrated separately from processor 133$p$ for clarity, but may be part of the processor 133$p$ or implemented in the processor based on instructions in the software 133$s$ which is run in the processor 133$p$ or may be implemented in hardware 133$h$ or firmware 133$f$. It will be understood as used herein that the processor 133$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 133$h$, firmware 113$f$, software 133$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 133$m$ and executed by the processor 133$p$. Memory 133$m$ may be implemented within or external to the processor 133$p$. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The server 130 may include means for obtaining a plurality of images of an environment, which may be, e.g., the image acquisition module 212. Means for extracting features from the plurality of images may be, e.g., reconstruction and registration module 214. Means for generating a reconstruction of the environment using the features may be, e.g., reconstruction and registration module 214. Means for registering the reconstruction of the environment to global orientation may be, e.g., means for associating a geographic orientation with each feature. Means for storing the reconstruction of the environment with the features binned together into a plurality of bins, wherein each bin is associated with a different predetermined range of geographic orientation may be, e.g., the feature packaging module 216 and database 135. Additionally, the server 130 may include means for determining a normal vector for each feature which may be, e.g., the reconstruction and registration module 214. Means for associating the orientation of the normal vector for each feature with respect to the geographic orientation may be, e.g., the reconstruction and registration module 214. Means for receiving position information from a mobile device may be the external interface 131. Means for retrieving a data set block associated with the position information may be, e.g., the database 135.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:
1. A method comprising:
capturing an image of an environment with a camera;
receiving geographic orientation data associated with the image;
accessing a bin of model features from a database based on the geographic orientation data, wherein the model features are from a pre-generated three-dimensional model of the environment and are binned in the database based on geographic orientation of the model features;
extracting features from the image;
comparing the features extracted from the image to model features in the bin of model features to produce a set of corresponding features; and
using the set of corresponding features to determine a position and an orientation of the camera.

2. The method of claim 1, further comprising:
producing at least a portion of a panoramic cylindrical map of the environment using the features extracted from the image;
wherein comparing the features extracted from the image to the model features in the bin of model features uses features from the portion of the panoramic cylindrical map.

3. The method of claim 1, wherein the image of the environment is a frame from a video stream.

4. The method of claim 1, further comprising:
receiving position data associated with the image; and
wherein accessing the bin of model features from the database based on the geographic orientation data comprises accessing a data set block of model features from the database based on the position data, wherein the data set block of model features comprises a plurality of bins of model features, and using the geographic orientation data to access the bin of model features from the plurality of bins of model features in the data set block.

5. The method of claim 1, further comprising:
determining a normal vector for each feature; and
associating the geographic orientation data to the normal vector for each feature;
wherein accessing the bin of model features from the database based on the geographic orientation data comprises using the geographic orientation data associated with the normal vector for each feature to retrieve model features from a corresponding bin of model features with normal vectors in a range of geographic orientations that includes the geographic orientation data associated with the normal vector.

6. The method of claim 5, further comprising:
determining a gravity vector for each feature; and
using the gravity vector when comparing the features extracted from the image to the model features in the bin of model features to produce the set of corresponding features, wherein each model feature has an associated gravity vector.

7. An apparatus comprising:
a camera capable of capturing images of an environment;
an orientation sensor capable of providing geographic orientation data; and
a processor coupled to the camera and the orientation sensor, the processor configured to extract features from an image, determine a geographic orientation for each feature; access a bin of model features for a database based on the geographic orientation of each feature, wherein the model features are from a pre-generated three-dimensional model of the environment and are binned in the database based on the geographic orientation of the model features; compare the features extracted from the image to the bin of model features to produce a set of corresponding features; and use the set of corresponding features to determine a position and an orientation of the camera.

8. The apparatus of claim 7, wherein the processor is further configured to:
produce at least a portion of a panoramic cylindrical map of the environment using the features extracted from the image;
wherein the processor is configured to compare the features extracted from the image to the model features in the bin of model features by configured to use features from the portion of the panoramic cylindrical map.

9. The apparatus of claim 7, further comprising:
a position sensor capable of determining a coarse position of the apparatus;
wherein the processor is coupled to the position sensor and is further configured to access a data set block of model features from the database based on the coarse position, wherein the data set block of model features comprises a plurality of bins of model features, and the processor is configured to use the geographic orientation data to access the bin of model features from the plurality of bins of model features in the data set block.

10. The apparatus of claim 7, wherein the processor is further configured to determine a normal vector for each feature; and associate the geographic orientation data to the normal vector for each feature; wherein the processor is configured to access the bin of model features from the database based on the geographic orientation data by being configured to use the geographic orientation data associated with the normal vector for each feature to retrieve model features from a corresponding bin of model features with normal vectors in a range of geographic orientations that includes the geographic orientation data associated with the normal vector.

11. The apparatus of claim 10, further comprising:
an accelerometer to determine a direction of gravity;
wherein the processor is coupled to the accelerometer and is further configured to determine a gravity vector for each feature and to use the gravity vector when comparing the features extracted from the image to the model features in the bin of model features to produce the set of corresponding features, wherein each model feature has an associated gravity vector.

12. The apparatus of claim 7, further comprising:
a wireless interface capable of communicating with a remote server coupled to the database, wherein the processor is configured to access the bin of model features from the database through the wireless interface.

13. An apparatus comprising:
means for capturing an image of an environment;
means for receiving geographic orientation data associated with the image;
means for accessing a bin of model features from a database based on the geographic orientation data, wherein the model features are from a pre-generated three-dimensional model of the environment and are binned in the database based on geographic orientation of the model features;
means for extracting features from the image;
means for comparing the features extracted from the image to model features in the bin of model features to produce a set of corresponding features; and
means for using the set of corresponding features to determine a position and an orientation of the apparatus.

14. The apparatus of claim 13, further comprising means for producing at least a portion of a panoramic cylindrical map of the environment using the features extracted from the image, wherein the means for comparing the features extracted from the image to the model features in the bin of model features uses features from the portion of the panoramic cylindrical map.

15. The apparatus of claim 13, further comprising:
means for receiving position data; and
wherein the means for accessing the bin of model features from the database based on the geographic orientation data accesses a data set block of model features from the database based on the position data, wherein the data set block of model features comprises a plurality of bins of model features, and uses the geographic orientation data to access the bin of model features from the plurality of bins of model features in the data set block.

16. The apparatus of claim 13, further comprising:
means for determining a normal vector for each feature; and
means for associating the geographic orientation data to the normal vector for each feature;
wherein the means for accessing the bin of model features from the database based on the geographic orientation data uses the geographic orientation data associated with the normal vector for each feature to retrieve model features from a corresponding bin of model features with normal vectors in a range of geographic orientations that includes the geographic orientation data associated with the normal vector.

17. The apparatus of claim 16, further comprising:
means for determining a gravity vector for each feature; and
means for using the gravity vector when comparing the features extracted from the image to the model features in the bin of model features to produce the set of corresponding features, wherein each model feature has an associated gravity vector.

18. A non-transitory computer-readable medium including program code stored thereon, comprising:
program code to receive geographic orientation data associated with an image of an environment captured with a camera;
program code to access a bin of model features from a database based on the geographic orientation data, wherein the model features are from a pre-generated three-dimensional model of the environment and are binned in the database based on geographic orientation of the model features;
program code to extract features from the image;
program code to compare the features extracted from the image to model features in the bin of model features to produce a set of corresponding features; and
program code to use the set of corresponding features to determine a position and an orientation of the camera.

19. The non-transitory computer-readable medium of claim 18, further comprising:
program code to receive position data associated with the image; and
wherein the program code to access the bin of model features from the database based on the geographic orientation data comprises program code to access a data set block of model features from the database based on the position data, wherein the data set block of model features comprises a plurality of bins of model features, and use the geographic orientation data to access the bin of model features from the plurality of bins of model features in the data set block.

20. The non-transitory computer-readable medium of claim 18, further comprising:
program code to determine a normal vector for each feature; and
program code to associate the geographic orientation data to the normal vector for each feature;
wherein the program code to access the bin of model features from the database based on the geographic orientation data comprises program code to use the geographic orientation data associated with the normal vector for each feature to retrieve model features from a corresponding bin of model features with normal vectors in a range of geographic orientations that includes the geographic orientation data associated with the normal vector.

21. A method comprising:
obtaining a plurality of images of an environment;
extracting features from the plurality of images;
generating a reconstruction of the environment using the features;
registering the reconstruction of the environment to a global orientation;
associating a geographic orientation with each feature; and
storing the reconstruction of the environment with the features binned together into a plurality of bins, wherein each bin is associated with a different predetermined range of geographic orientation.

22. The method of claim 21, wherein associating the geographic orientation with each feature comprises:
determining a normal vector for each feature; and
associating an orientation of the normal vector for each feature with respect to the geographic orientation.

23. The method of claim 22, wherein determining the normal vector for a feature comprises:
determining vectors connecting a three-dimensional position of the feature and positions of all cameras that capture images of the three-dimensional position in the plurality of images of the environment; and
calculating a mean of the vectors as the normal vector.

24. The method of claim 21, further comprising:
storing the reconstruction of the environment in a plurality of data set blocks based on position, wherein each data set block comprises a different plurality of bins of features;
receiving position data from a mobile device; and
retrieving a data set block associated with the position data.

25. An apparatus comprising:
a database;
a processor coupled to the database, the processor being configured to generate a reconstruction of an environment using features extracted from a plurality of images of the environment, register the reconstruction of the environment to a global orientation, associate a geographic orientation with each feature; and store in the database the reconstruction of the environment with the features binned together into a plurality of bins, wherein each bin is associated with a different predetermined range of geographic orientation.

26. The apparatus of claim 25, wherein the processor is configured to associate the geographic orientation with each feature by being configured to determine a normal vector for each feature; and associate an orientation of the normal vector for each feature with respect to the geographic orientation.

27. The apparatus of claim 26, wherein the processor is configured to determine the normal vector for the feature by being configured to determine vectors connecting the 3D point of the feature and all cameras imaging the 3D point; and calculate a mean of the vectors as the normal vector.

28. The apparatus of claim 25, further comprising:
an external interface capable of receiving position information from a mobile device; and
wherein the processor is further configured to store the reconstruction of the environment in a plurality of data set blocks based on position, wherein each data set block comprises a different plurality of bins of features.

29. An apparatus comprising:
means for obtaining a plurality of images of an environment;
means for extracting features from the plurality of images;
means for generating a reconstruction of the environment using the features;
means for registering the reconstruction of the environment to global orientation;
means for associating a geographic orientation with each feature; and
means for storing the reconstruction of the environment with the features binned together into a plurality of bins, wherein each bin is associated with a different predetermined range of geographic orientation.

30. The apparatus of claim 29, wherein the means for associating the geographic orientation with each feature comprises means for determining a normal vector for each feature; and means for associating an orientation of the normal vector for each feature with respect to the geographic orientation.

31. The apparatus of claim 30, wherein the means for determining the normal vector for a feature determines vectors connecting a three-dimensional position of the feature and positions of all cameras that capture images of the three-dimensional position in the plurality of images of the environment; and calculates a mean of the vectors as the normal vector.

32. The apparatus of claim 29, wherein the means for storing the reconstruction of the environment stores the reconstruction in a plurality of data set blocks based on position, wherein each data set block comprises a different plurality of bins of features, the apparatus further comprising:
means for receiving position information from a mobile device; and
means for retrieving a data set block associated with the position information.

33. A non-transitory computer-readable medium including program code stored thereon, comprising:
program code to extracting features from a plurality of images of an environment;
program code to generate a reconstruction of the environment using the features;
program code to register the reconstruction of the environment to global orientation;
program code to associate a geographic orientation with each feature; and
program code to store the reconstruction of the environment with the features binned together into a plurality of bins, wherein each bin is associated with a different predetermined range of geographic orientation.

34. The non-transitory computer-readable medium of claim 33, wherein the program code to associate the geographic orientation with each feature comprises:
program code to determine a normal vector for each feature; and
program code to associate an orientation of the normal vector for each feature with respect to the geographic orientation.

35. The non-transitory computer-readable medium of claim 34, wherein the program code to determine the normal vector for the feature comprises:
program code to determine vectors connecting a three-dimensional position of the feature and positions of all cameras that capture images of the three-dimensional position in the plurality of images of the environment; and
program code to calculate a mean of the vectors as the normal vector.

36. The non-transitory computer-readable medium of claim 33, further comprising:
program code to store the reconstruction of the environment in a plurality of data set blocks based on position, wherein each data set block comprises a different plurality of bins of features;
program code to receive position data from a mobile device; and
program code to retrieve a data set block associated with the position data.

* * * * *